Sept. 21, 1948. J. RAPP 2,449,670
HOUSE MOVING DOLLY
Filed July 8, 1947 3 Sheets-Sheet 1

Inventor
John Rapp

Sept. 21, 1948.                J. RAPP                    2,449,670
                           HOUSE MOVING DOLLY
Filed July 8, 1947                                   3 Sheets-Sheet 2

Inventor

John Rapp

By *Clarence A. O'Brien and Harvey B. Jacobson*
                                            Attorneys Sept. 21, 1948.　　　　　J. RAPP　　　2,449,670
HOUSE MOVING DOLLY
Filed July 8, 1947　　　　　　　　　　3 Sheets-Sheet 3

Inventor

John Rapp

By *Clarence A. O'Brien and Harvey B. Jacobson*
Attorneys

Patented Sept. 21, 1948

2,449,670

UNITED STATES PATENT OFFICE 2,449,670

HOUSE MOVING DOLLY

John Rapp, Rapid City, S. Dak.

Application July 8, 1947, Serial No. 759,500

1 Claim. (Cl. 280—116)

This invention relates to novel and useful improvements in a house moving dolly and more specifically pertains to a novel construction of supporting truck for the front end of a trailer designed for moving houses and the like.

The principal purpose of this invention resides in providing an improved construction of supporting truck for the front end of a trailer for moving any object, wherein an improved swiveling connection is provided for mounting the front end of the trailer upon the supporting truck; wherein this swiveling connection is so placed upon the supporting truck as to greatly improve the stability of operation of the trailer; wherein an extremely sturdy supporting truck is provided for the front end of the trailer for moving extremely heavy loads therein; wherein an improved working mechanism is provided for the rear wheels of the supporting truck adapted for detachable connection with the brake operating means of a tractor vehicle; wherein a highly improved form of drawbar or tongue is provided for pulling and steering the supporting truck.

These, together with further ancillary objects of the invention which will later become apparent as the following description proceeds, are attained by this device, the preferred embodiment of which has been illustrated, solely by way of example, in the accompanying drawings, wherein:

Figure 6 is a perspective view of the drawbar of the trailer; and

Figure 7 is a fragmentary perspective view of a portion of the invention.

Figure 1:
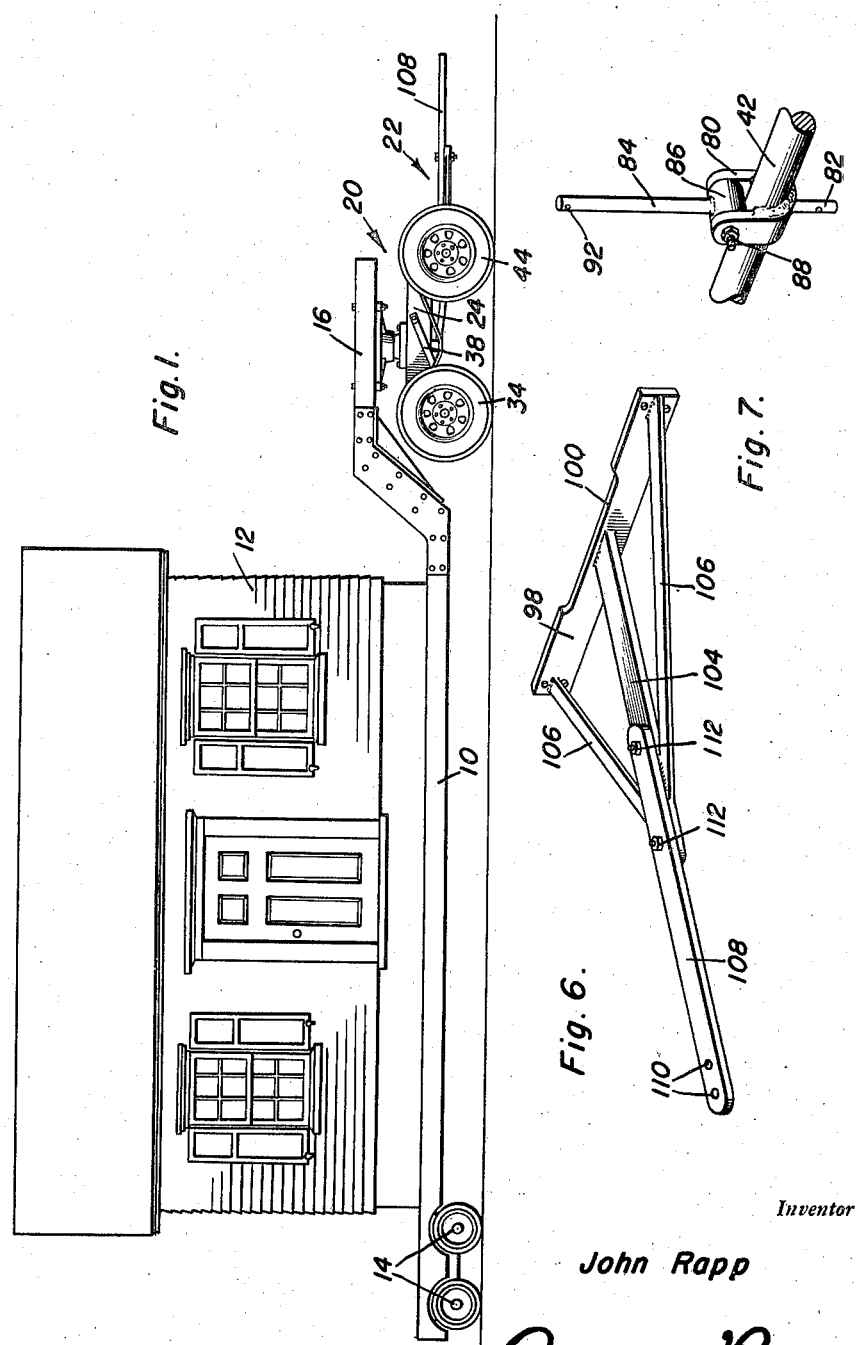
Figure 1 is a side elevational view showing a trailer for moving a house and a supporting truck secured to the front end thereof in accordance with the principles of this invention.

Referring now more specifically to the accompanying drawings, wherein like numerals designate similar parts throughout the various views, attention is directed first to Figure 1 wherein there is disclosed a dolly or trailer 10 of sufficient size and strength of construction to transport a house indicated at 12 thereon, the rear end of this trailer being provided with a pair of wheeled axles 14, while the front end thereof is elevated to provide an overhanging portion 16 adapted for swivel support upon a truck designated generally at 20.

Extending from the front end of the supporting truck 20 in a manner to be subsequently set forth, is a drawbar construction designated generally at 22, and which is adapted for attachable engagement with a tractor vehicle, not shown, by means of which the trailer may be moved and its operation guided and controlled.

Figure 2:
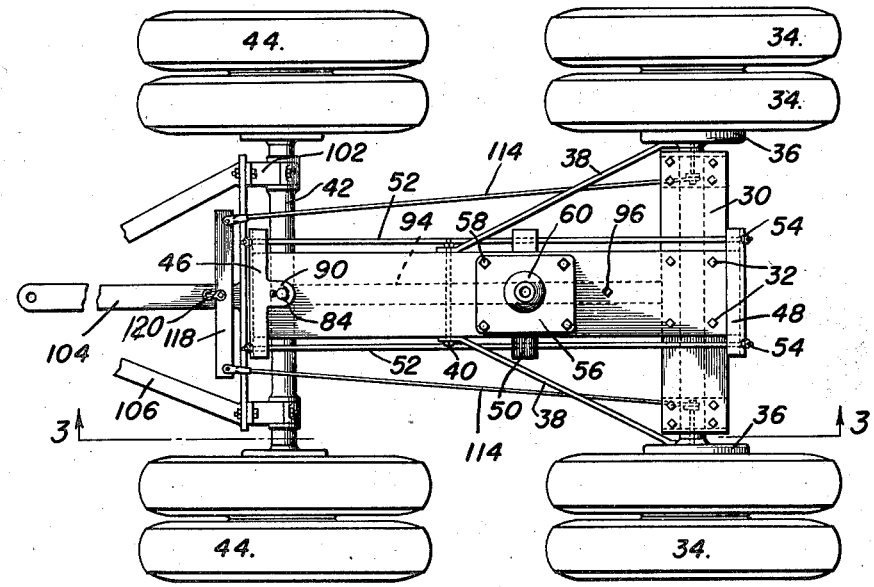
Figure 2 is a top plan view of the supporting truck of the trailer.
Figure 3:
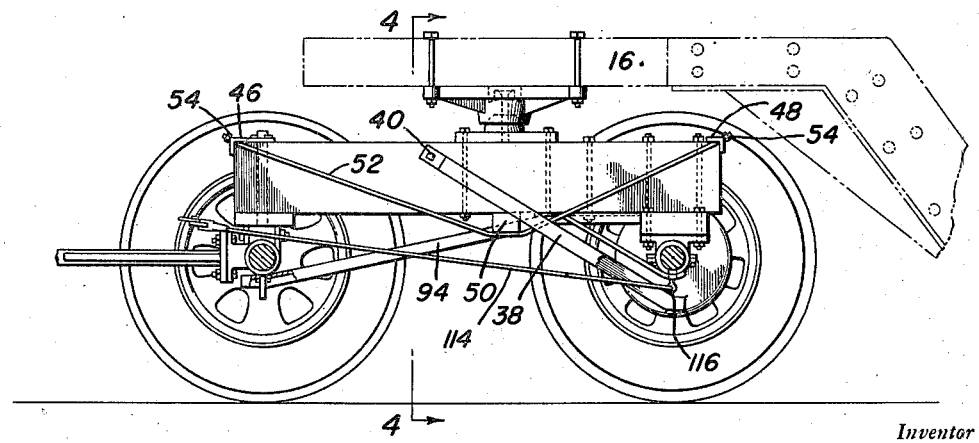
Figure 3 is a longitudinal vertical sectional view taken substantially upon the section line 3—3 of Figure 2 and showing the construction of the supporting truck together with the mounting of the front end of the trailer thereon.
Figure 4:
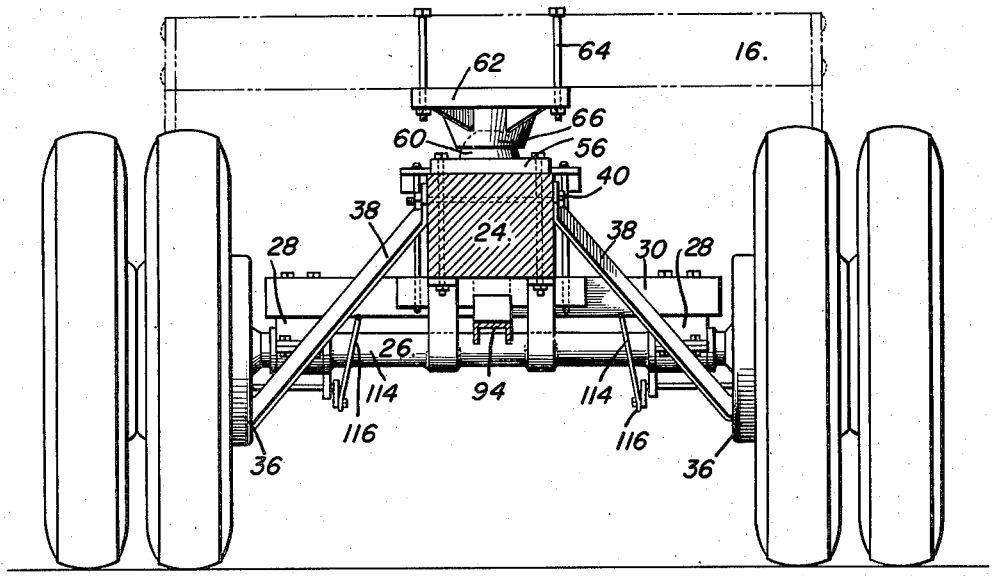
Figure 4 is a transverse vertical sectional view taken through the front portion of the supporting truck and the front end of the trailer mounted thereon, taken substantially upon the section line 4—4 of Figure 3.

For a better understanding of the front supporting truck, whose construction forms the subject matter of this invention, attention is now directed chiefly to Figures 2, 3 and 4. This supporting truck, which will necessarily be a very heavy, rigid and sturdy construction in view of the purposes for which it is intended, consists of a longitudinally extending beam 24 of any suitable material such as heavy wood or a steel beam as preferred, which beam is supported at its rear end by a transversely disposed axle 26 mounted as by journals 28 beneath a transversely extending axle block 30, rigidly secured beneath the longitudinal beam as by fastening means 32. Any suitable number of supporting wheels 34 are attached in a conventional manner to the ends or extremities of the axle 26. Conventional types of brake houses 36 housing any suitable brake operation mechanism, not shown, are attached to the axle 26, and reinforcing rods 38 are terminally connected to these brake houses and to the side of the longitudinal beam 24 at a position forwardly of its midpoint as by means of a fastening bolt 40 or the like. These reinforcements serve to rigidly secure and brace the rear axle assembly upon the truck.

The front axle 42 is pivotally secured intermediate its end beneath the front portion of the longitudinal beam 24 and is provided with a plurality of wheels 44 suitably journalled upon its extremities. The front axle 42 is employed to tow the trailer, and also is utilized to steer and guide the truck as well as assist the rear axle in supporting the load of the trailer 10 thereon.

In order to further reinforce and strengthen the beam 24 for supporting the load imposed thereon by the loading trailer, a truss type of reinforcement is employed as shown in Figures 2 and 3, this reinforcement comprising a pair of angle iron members 46 and 48 embracing the forward and rearward upper edges of the beam 24. Extending transversely beneath the midpoint of the longitudinal beam 24 is a strut 50 of any suitable material such as hardwood, steel or the like, and a pair of trusses in the form of terminally threaded tension rods 52 are positioned under the strut 50 and have their ends extending through suitable apertures in the angle irons 46 and 48, these rods being tensioned as by nuts 54 threaded upon the outer extremities thereof. By means of this truss construction, the longitudinal beam is further strengthened against sagging along its length under the load to be imposed thereon.

Figure 5:
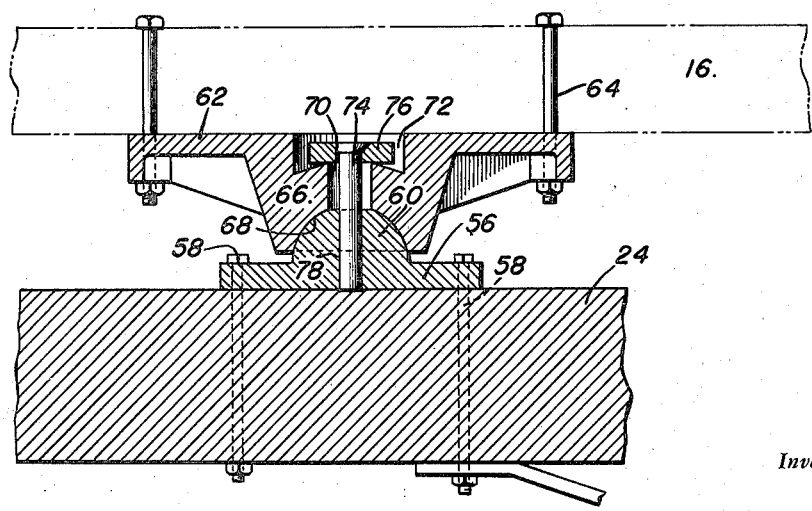
Figure 5 is a longitudinal vertical sectional view representing an enlarged detailed view of the swiveling connection between the supporting truck and the trailer.

A swiveling connection whose construction is shown best in Figure 5, is secured to the upper surface of the beam 24 intermediate its end and to the lower surface of the front portion 16 of the trailer 10. This swiveling connection comprises a generally rectangular plate 56 secured as by a plurality of bolts 58 to the beam 24, this plate providing a hemi-spherical ball seat 60 centrally thereof. A complementary plate 62 is secured to the under surface of the portion 16 of the trailer as by bolts 64, and this plate is provided with a centrally depressed boss 66 whose lower surface is provided with a hemi-spherical socket or seat 68 which is adapted to snugly receive the ball seat 60 carried by the beam 24, for swiveling and socketing engagement therewith. The boss 66 is further provided with a downwardly extending bore 70 opening at its lower end into the socket 68 while its upper end terminates in a well or recess 72 in the upper surface of the plate 62. A retaining bolt, pin or the like 74 having a suitable enlarged head 76, is received in countersunk and recessed position in the well 72, this pin 74 extending loosely through the bore 70 and being received in an aligned bore 78 formed in the ball member 60. As will be seen from an inspection of Figure 5, the retaining pin 74 is tightly received in the ball member 60, while its head 76 retains the socket member 68 upon the complementary swiveling connector, while sufficient clearance is provided between the member 74 and the bore 70, to permit considerable oscillatory movement of the ball seat upon the supporting ball 60. By means of this construction, considerable lateral and longitudinal inclination is permitted to the supporting truck 20 without altering or shifting the even support of the trailer 10.

It should be here noted that the strut 50 above mentioned is preferably located beneath the center of the swiveling connection, to thereby strengthen and support the beam at the point where it receives the greatest bending load thereon, while the rear brace rods 38 for the rear axles are connected to the beam forwardly of the strut and of the swiveling connection.

Attention is now directed more specifically to the construction and mounting of the front axle, and for this purpose reference is made especially to Figures 2, 3 and 7 of the drawings. As shown more clearly in Figure 7, the front axle 42 is welded or otherwise rigidly secured at its midpoint within a yoke member 80 having upwardly extending legs, and an integral downwardly extending pin 82. Aligned with the pin 82 is an upwardly extending pivot rod 84 having an enlarged head portion 86 at its lower end which is journalled for oscillatory movement between the arms of the yoke 80 as by a nut and bolt fastening means 88. As indicated in Figures 2 and 3, the pivot pin 84 extends upwardly through the front end of the longitudinal beam 24 whereby the front axle 42 is pivotally mounted thereon, this pivot pin extending through an intermediate, rearwardly positioned lug or extension 90 carried by the front angle iron member 46. The upper extremity of the pivot pin 84 is provided with a retaining means such as a diametrical bore 92 adapted to receive a cotter pin or the like for retaining the pivot pin in its bore extending vertically through the beam 24.

A reinforcing rod or strap 94 is terminally secured at one end upon the downwardly extending pin 82, and at the other end to the lower surface of the longitudinal beam at a point rearwardly of the strut 50 and swiveling connection, as by means of a bolt 96. As will be seen, the front end of this reinforcing rod is journalled upon the pivot end of the front axle, whereby movement of the axle will not disturb the position and reinforcing function of this rod.

In order to tow the trailer, and to steer and guide the same, a drawbar whose construction is shown best in Figure 6 and indicated in Figures 2 and 3, is provided. This drawbar construction 22, consists of a transversely extending bar or beam of suitable material as shown at 98, and which is provided intermediate its end and upon its upper edge with a recess or notched portion 100 for a purpose to be later set forth, is attached rigidly, as by means of rearwardly extending clamps 102, to the axle 42 on opposite sides of the pivot pin 84. Centrally and forwardly extending from the cross beam 98 is a member 104 while inclined reinforcing members 106 are terminally connected to the extremities of the cross beam 98 and to the sides of the forwardly extending member 104. All of these connections may preferably be formed by welding or the like. A tongue, indicated at 108, is provided at its forward end with a plurality of apertures 110 by means of which the same may be connected with a tractor or other vehicle for towing the trailer; while its rear extremity is provided with a plurality of fastening means 112 for securing the tongue to the member 104 to form a rigid assembly therewith.

As will be readily understood, the tongue 108 may be employed in the customary function of towing and guiding the front axle of the supporting truck 20 of the trailer 10. It should be noted that the stress of the drawbar 108 and 104 applied at a plurality of spaced points upon the beam 98, while the latter distributes the load to the axle at opposite sides of the pivot point thereof, to improve the stability of the steering of the trailer.

Attention is next directed to the brake mechanism of the truck, which is shown best in Figures 2 and 3. Forwardly extending laterally disposed brake operating links or rods 114 are provided which are pivotally connected at their rear ends to suitable brake operating levers not shown, as at 116, while their front ends are pivotally connected to a transverse bar 118 at the extremities thereof. It is intended that the brake links or rods shall rest within the above mentioned notch or recess 100 in the crossbar 98, while any suitable form of detachable connection, such as a hook 120 is provided intermediate the bar 118 for detachable connection with a brake operating means of a tractor, not shown.

From the foregoing, it is believed that the construction and operation of the invention will be readily understood, and since various modifications of the same will be obvious to those skilled in the art after a consideration of the accompanying specification and drawings, it is not intended to limit the invention to the exact construction shown and described, since all suitable modifications and equivalents may be resorted to falling within the scope of the intended claim.

What is claimed as new is as follows:

In a trailer, a wheeled truck pivotally supporting the front end of a wheeled trailer, said truck including a longitudinal beam, front and rear axles secured transversely beneath said beam and a swiveling connection carried intermediate said beam and secured to the front end of a trailer, reinforcing rods secured to said rear axle and to said beam forwardly of said swiveling connection, a transverse strut beneath the midpoint of said beam, and laterally spaced, longitudinal trusses engaging said strut and terminally secured to the upper ends of said beam.

JOHN RAPP.

REFERENCES CITED

The following references are of record in the file of this patent:

UNITED STATES PATENTS

| Number | Name | Date |
|---|---|---|
| 1,160,690 | Choate | Nov. 16, 1915 |
| 1,495,556 | Halbert | May 27, 1924 |
| 1,641,848 | Griffin | Sept. 6, 1927 |
| 1,855,238 | Higbee | Apr. 26, 1932 |